United States Patent
Hyttinen et al.

[11] Patent Number: 5,815,385
[45] Date of Patent: Sep. 29, 1998

[54] CONTROL OF AN INSTALLATION FOR TRANSMISSION OF HIGH-VOLTAGE DIRECT CURRENT

[75] Inventors: Mats Hyttinen; Henrik Spjut, both of Ludvika, Sweden

[73] Assignee: Asea Brown Boveri AB, Västerås, Sweden

[21] Appl. No.: 732,382

[22] PCT Filed: May 24, 1995

[86] PCT No.: PCT/SE95/00587

§ 371 Date: Oct. 9, 1996

§ 102(e) Date: Oct. 9, 1996

[87] PCT Pub. No.: WO95/32537

PCT Pub. Date: Nov. 30, 1995

[30] Foreign Application Priority Data

May 24, 1994 [SE] Sweden ................................ 9401774

[51] Int. Cl.⁶ .............................. H02J 3/00; H02H 7/00; H02M 3/24
[52] U.S. Cl. ................................. 363/34; 363/51; 363/79
[58] Field of Search ................................ 363/34, 35, 51, 363/79

[56] References Cited

U.S. PATENT DOCUMENTS

| | | | |
|---|---|---|---|
| 4,126,892 | 11/1978 | Ekstrom et al. | 363/35 |
| 4,222,097 | 9/1980 | Rogowsky | 363/51 |
| 4,263,517 | 4/1981 | Konishi | 363/35 |
| 4,264,951 | 4/1981 | Konishi et al. | 363/35 |
| 4,279,009 | 7/1981 | Andronov et al. | 363/35 |
| 4,330,815 | 5/1982 | Konishi | 363/35 |
| 4,425,624 | 1/1984 | Planche | 364/802 |
| 4,516,198 | 5/1985 | Liss | 363/35 |
| 4,555,750 | 11/1985 | Matsumura et al. | 363/37 |
| 4,672,519 | 6/1987 | Liss | 363/35 |
| 5,099,409 | 3/1992 | Bando et al. | 363/54 |
| 5,249,141 | 9/1993 | Vanderbroek et al. | 364/557 |

FOREIGN PATENT DOCUMENTS 24 37 333  4/1976  Germany.

OTHER PUBLICATIONS

Patent Abstracts of Japan, vol. 14, No. 328, Abstract of JP–A–2–111219, Apr. 1990.

*Primary Examiner*—Peter S. Wong
*Assistant Examiner*—Bao Q. Vu
*Attorney, Agent, or Firm*—Pollock, Vande Sande & Priddy

[57] ABSTRACT

In a method for control of an installation for transmission of high-voltage direct current in dependence on at least one stress parameter for a valve in a converter included in the installation and controlled by control equipment (CE1, CE2), a value (PDR, PDI, UMAX, TRC, TTC) of the stress parameter is continuously calculated, based on predetermined relationships (f1, f2, g1R, g2R, g1I, g2I, h1, h2) and in dependence on measured values (UN, α, γ, ID, TO, TI, RECT/INV) of the operating parameters of the installation. At least one influencing signal (HTH, HCC, HCR) is generated in dependence on a comparison between the calculated value and at least one comparison value for the parameter, and the influencing signal is supplied to the control equipment to influence this in a direction which limits the value of the stress parameter.

The member (HAS) comprises a monitoring device (PD, UA, TR, TT) for calculating the value of the stress parameter.

34 Claims, 11 Drawing Sheets

CONTROL OF AN INSTALLATION FOR TRANSMISSION OF HIGH-VOLTAGE DIRECT CURRENT

TECHNICAL FIELD

The present invention relates to a method for control of an installation for transmission of high-voltage direct current in dependence on at least one stress parameter for a valve in a converter included in the installation, and to a means for carrying out the method.

The means comprises monitoring devices for continuously calculating a value of the stress parameter, based on predetermined relationships and in dependence on supplied values of the operating parameters of the installation, and for generating, in dependence on a comparison with a comparison value for the parameter, an influencing signal for influencing the control equipment of the converter.

BACKGROUND OF THE INVENTION

An installation for transmission of high-voltage direct current between two ac networks comprises at least two converters and a dc connection, which connects the direct-voltage terminal of one of the converters to the corresponding direct-voltage terminal on the other converter. The converters are each connected with their alternating-voltage terminals to one of the ac networks via transformers equipped with on-load tap-changers. Further, shunt-connected filters connected to the alternating-voltage network are usually included. For filtering harmonics generated by the converters, the filters are designed to be tuned, or with high-pass characteristic, but they are also often dimensioned to generate reactive power for compensation of the reactive power consumed by the converters during operation. Also, purely capacitive shunt filters, the only duty of which is to generate reactive power, occur. The filters mentioned may be distributed on a plurality of units, which makes possible connection and disconnection in dependence on the operating case of interest and the need of filtering and of generation of reactive power. During normal operation, one of the converters, hereinafter referred to as the rectifier, operates in rectifier operation, and the other converter, hereinafter referred to as the inverter, operates in inverter operation. The converters are each controlled by its own control equipment in such a way that the inverter determines the level of the direct voltage whereas the rectifier determines the level of the direct current, and hence of the transferred power. The inverter is normally controlled to a maximum possible voltage level, taking into consideration safety margins with respect to commutating errors, voltage variations on the alternating-voltage side, and other deviations from nominal operation which may occur. The rectifier is controlled in current control in dependence on a current order formed by a power order and the actual direct voltage.

To ensure rapid correction of disturbances occurring by influencing the control angles of the converters, the control angle $\alpha$ of the rectifier and the extinction angle $\gamma$ of the inverter during stationary operation should be allowed to vary both upwardly and downwardly around chosen nominal values, which are typically in the order of magnitude of $\alpha=15°$ and $\gamma=17°$. By means of a control unit for controlling the tap-changers, which operates in dependence on reference values for control angle and extinction angle, respectively, the ideal no-load direct voltage of the converters in the current operating case is adapted such that the angles are near their respective reference values.

The control equipment of both the rectifier and the inverter may comprise a reference value-forming control unit which calculates reference values for direct voltage, control and extinction angles, respectively. These reference values are passed to the control unit for the tap-changers and to a control unit for control of the control and commutating angles. The reference value-forming control units for the rectifier and the inverter communicate with each other via a telecommunications link, which also transmits information about other operating parameters in the installation, for example ordered current in the dc connection.

The control unit of the rectifier for control angle control operates in dependence on reference values for the control angle $\alpha$, for the direct voltage UdR, and for the direct current Id, and its control equipment is arranged so that the reference value which provides the greatest control angle is selected. For the rectifier it is advantageous in this connection to set the reference value of the control angle at zero to achieve the greatest range of variation in control angle for the current control. The control unit of the inverter for control angle control operates in dependence on reference values for the extinction angle $\gamma$, for the direct voltage UdI and for the direct current Id, and its control equipment is arranged so that the reference value which provides the greatest extinction angle is selected.

In the rectifier the control unit of the tap-changer operates in dependence on reference values for the direct voltage UdR in the rectifier and for the control angle $\alpha$, and in the inverter in dependence on reference values for the direct voltage UdI in the inverter and for the commutating angle $\gamma$. The control equipment of the rectifier is arranged so that the tap-changer is influenced only by a deviation in the control angle whereas the control equipment of the inverter is arranged so that the tap-changer is influenced either by deviation in direct voltage or by deviation in extinction angle.

The reactive power exchange with the ac networks can be controlled with a control system for reactive power, which, in dependence on the desired power exchange, influences connection and disconnection of the filters, the position of the tap-changers and normally also, via the control unit for control angle and extinction angle control, the control angle $\alpha$ and the extinction angle $\gamma$ of the converters for the rectifier and the inverter, respectively. In addition to an output signal for connection and disconnection of filter units, the control system for reactive power may generate a correction value for control angle and extinction angle, respectively, which value, via the above-mentioned reference value-forming control unit, influences the control unit of the tap-changer and the control unit for control angle and extinction angle control.

In an operating case where the requirement for harmonic filtering means that a certain number of filters must be connected, the consequence may be that the ensuing reactive power generation exceeds that which is required via the control system for reactive power. This normally leads to the tap-changers being controlled towards a higher voltage on the alternating-voltage terminals of the converter in order thus to achieve, in case of retained direct voltage, an increase of the control and extinction angles of the converters and hence of their reactive power consumption. In the event that the tap-changers cannot be influenced via the control units mentioned, for example by being reset for manual operation or being out of order for some other reason, the required increase of the control angle and the extinction angle is achieved directly via the control unit for control angle and extinction angle control.

Also, a manually ordered influence on the tap-changer position, or on the reference value for control and extinction angles, may lead to these angles increasing.

However, increased control and extinction angles, respectively, increase the stresses on the components included in the main circuit. The converters are normally designed as converters in a bridge connection with a number of series-connected thyristors in each valve, whereby a damping circuit is connected in parallel with each thyristor and comprises a series connection of a resistor and a capacitor. Further, a damping reactor is usually connected in series with the thyristors and a surge arrester is connected in parallel with the valve. The power development in and hence the thermal stress on the damping circuits are substantially dependent on the ideal no-load direct voltage and on the control and extinction angles, respectively. The power development in, and hence the thermal stress on the damping reactor, are substantially dependent on the ideal no-load direct voltage and on the control angle. The power losses in the damping circuit and the temperature in the damping reactor constitute two stress parameters to consider during operation of the installation. The voltage stress on the surge arrester during decommutation of a value is substantially dependent on the ideal no-load direct voltage and the extinction angle and constitutes another stress parameter. The power development in the thyristors and hence their thermal stress are substantially dependent on the ideal no-load direct voltage and the direct current and on the overlap angle (which may be expressed with the aid of the control and extinction angles) and constitute an additional parameter.

An installation of the kind described here is usually projected to operate in a large number of different operating cases, and to ensure that allowed stresses are not exceeded to any component, a number of pre-calculated restrictions in the form of limiting circuits are usually introduced in the different control units, among other things to limit the range of variation of the control and extinction angles for different values of the ideal no-load direct voltage taking into consideration the above-mentioned stress parameters and based on known component data.

The calculation of the above-mentioned restrictions, which also must comprise safety margins, per se entails extensive work which generally requires simulation of the different operating cases on a computer or a model. For this reason, it is difficult afterwards to survey which stress parameter determines the restriction in a certain operating case. Therefore, the method generally means that the components included in the main circuit of the valve cannot be utilized in full, which is uneconomical per se and which furthermore may mean that the installation in its entirety is not utilized in full in certain situations.

SUMMARY OF THE INVENTION

The object of the invention is to provide an improved method for ensuring that any of the above-mentioned stress parameters do not exceed allowed values during any operating case, and a device for carrying out the method.

According to the invention, this is achieved by measuring operating parameters, on which the stress parameters in question are dependent, during operation of the installation, supplying measured values of these operating parameters to a monitoring unit with monitoring devices for continuous calculation of the respective stress parameter, based on a chosen relationship and in dependence on the measured values supplied, comparing the calculation results with chosen comparison values, and, in dependence on the comparison, generating an influencing signal for influencing the control equipment of the converter in a direction which limits the magnitude of the stress parameter.

Advantageous improvements of the invention will become clear from the following description and claims.

By means of the invention, extensive calculation work can be eliminated and the installation can in all operating cases work optimally with respect to the above-mentioned stress parameters.

BRIEF DESCRIPTION OF THE DRAWINGS

The invention will be explained in greater detail by description of embodiments with reference to the accompanying drawings, wherein FIG. 1 schematically shows an installation for transmission of high-voltage direct current, FIG. 2 schematically shows a 6-pulse bridge included in a converter according to FIG. 1, FIG. 3 schematically shows components in the main circuit of a valve included in a bridge according to FIG. 2.

DESCRIPTION OF THE PREFERRED EMBODIMENTS

The following description relates both to the method and to the device.

In order not unnecessarily burden the presentation, it is not specifically marked whether the equipment, units, devices and members, measured values and signals, described in the text and the figures, relate to the rectifier or the inverter except in those cases where there would otherwise be a risk of confusion. Unless otherwise stated, the description relates to the rectifier and its control equipment and it should be understood that the control equipment of the inverter may be designed in a manner similar to that of the rectifier.

Figure 1:
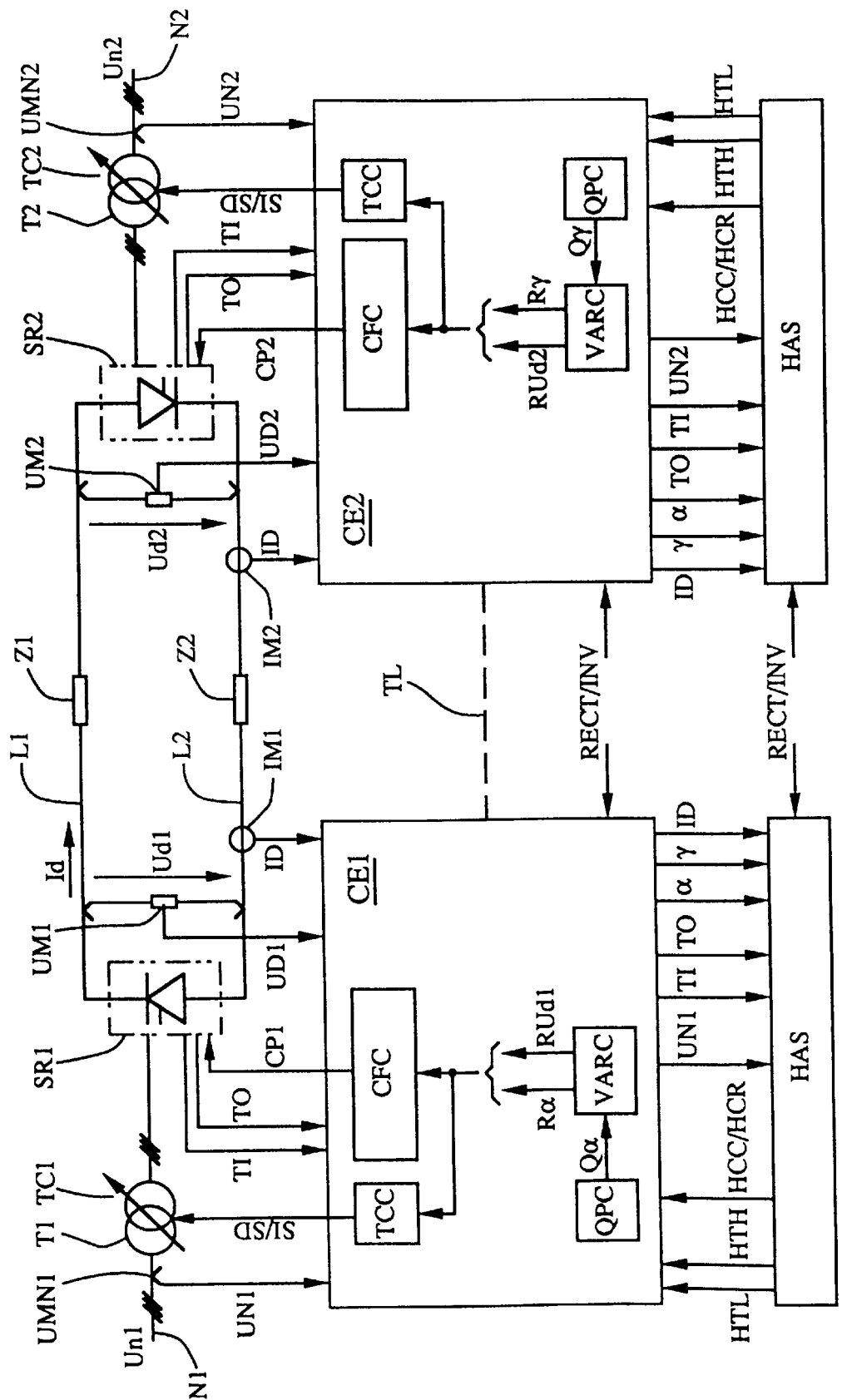

FIG. 1 shows an installation for transmission of high-voltage direct current between two three-phase alternating-voltage network N1 and N2, only roughly indicated.

A converter SR1 is connected with its alternating-voltage terminals to the network N1 via a transformer T1 and a converter SR2 is connected with its alternating-voltage terminals to the network N2 via a transformer T2. Each one of the transformers is equipped with a tap-changer TC1, TC2, respectively, marked with an arrow in the figure. A dc connection L1, L2 connects the direct-voltage terminals of the converter SR1 to the corresponding direct-voltage terminals on the converter SR2. The impedances of the dc connection are designated Z1, Z2, respectively.

For description of the embodiment, it is assumed that the converter SR1 operates as a rectifier and the converter SR2 operates as an inverter, but both converters may, in a known manner, be adapted to operate both as rectifiers and inverters.

Figure 2:
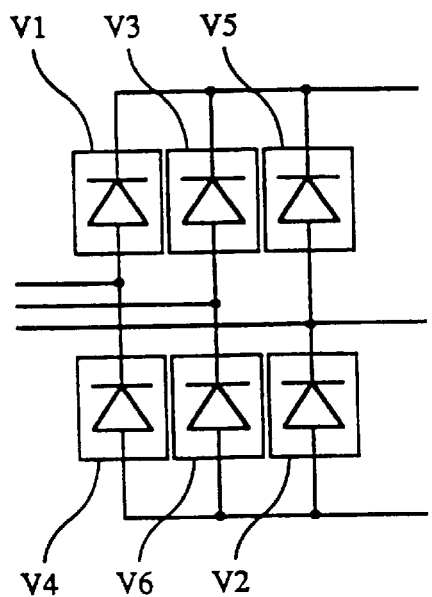
Figure 3:
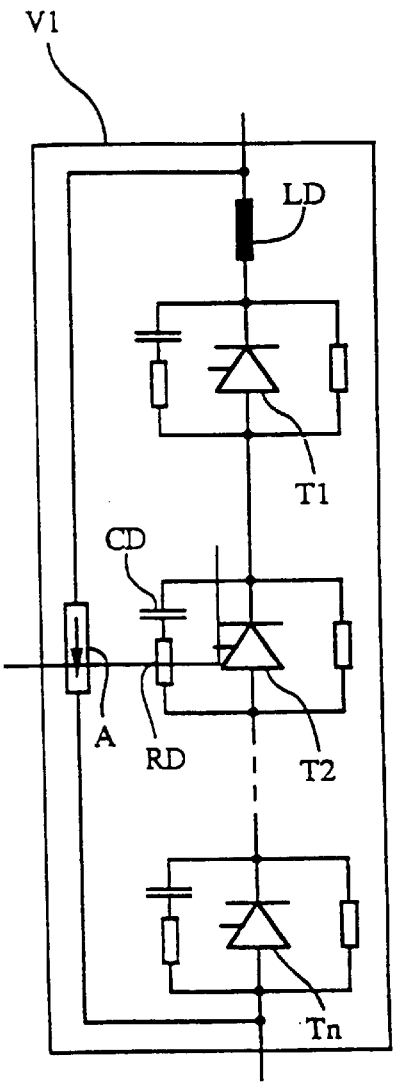

The converters may be designed in a known manner as two series-connected 6-pulse bridges to form a 12-pulse connection, the transformers comprising one secondary winding in Y-connection and one secondary winding in Δ-connection. Each 6-pulse bridge comprises, as shown in FIG. 2, six mutually identical valves V1–V6, connected between the alternating-voltage and direct-voltage terminals of the converter. The valve V1 is illustrated in FIG. 3. By a valve is meant, in this connection, a unit comprising a number of mutually series-connected controllable semiconductor elements T1, T2, . . . Tn, three of which being shown in the figure. Each of the semiconductor elements is connected in parallel with a damping circuit in the form of a resistor RD with a capacitor CD connected in series. A damping reactor LD is connected in series with the semiconductor elements. A surge arrester A is connected in parallel with the series circuit formed by the semiconductor elements and the damping reactor. The valves are adapted for water cooling of the semiconductor elements and of the damping reactor. The semiconductor elements comprise thyristors.

The direct voltage UD1 at the rectifier and the direct voltage Ud2 at the inverter are measured by means of voltage-measuring devices UM1, UM2, respectively (FIG. 1), which deliver the measured values UD1 and UD2, respectively. The current Id through the dc connection is measured by current measuring devices IM1, IM2, respectively, which deliver the measured value ID. The voltages Un1 and Un2, respectively, of the alternating-voltage network are measured by voltage-measuring devices UMN1 and UMN2, respectively, which deliver the measured values UN1 and UN2, respectively. The temperature Ti of the cooling water supplied to a valve, and the temperature To of the cooling water which leaves this valve, are measured in a known manner to form measured values TI and TO, respectively.

Each converter is equipped with a piece of control equipment CE1, CE2, respectively (FIG. 1). Each of the pieces of control equipment comprises a control unit CFC for control angle and extinction angle control, which control unit, in a known way, comprises a power control unit PPC (not shown in FIG. 1) for control of transmitted power in the installation, a tap-changer control unit TCC for control of the respective tap-changer, and a reference value control unit VARC for generating and supplying reference values Rα and Rγ for the control and extinction angles, respectively, and reference values RUd1 and RUd2 for the voltage Ud1 of the rectifier and the voltage Ud2 of the inverter, respectively. These reference values are supplied to the control unit CFC and the tap-changer control unit TCC. Each of the pieces of control equipment further comprises a control unit QPC for control of the reactive power exchange with the alternating-voltage networks, the output signal Qα and Qγ of which influences the generation by the reference value control unit of the reference values Rα and Rγ for control angle and extinction angle, respectively.

The pieces of control equipment of the converters are supplied with the above-mentioned measured values of the operating parameters of the installation, i.e., the control equipment of the rectifier is supplied with measured values for the voltage of the alternating-voltage network, for the direct voltage at the rectifier and the direct current in the dc connection as well as for inlet and outlet temperatures of the cooling water of the valves of the rectifier, and the control equipment of the inverter is supplied with corresponding measured values relating to the inverter. In addition, in a manner not shown in the figure but known per se, the pieces of control equipment are supplied with input signals with information about the position of the tap-changers and a power direction signal RECT/INV, the latter signal indicating rectifier operation and inverter operation, respectively, and being determined in dependence on the power direction requested by the operator of the installation.

In dependence on measured values and input signals supplied to the pieces of control equipment, the control units CFC of the rectifier and the inverter for control angle and extinction angle control generate control pulses CP1, CP2, respectively, for the valves of the converters, and the tap-changer control unit TCC generates INCREASE/DECREASE impulses SI/SD for the tap-changers. The control pulses are supplied to the respective valves, and the INCREASE/DECREASE signals are supplied to the operating equipment of the tap-changers. In a known manner, the two pieces of control equipment communicate with each other via a telecommunication link TL for two-way transmission of information about the operating parameters of the converters.

Further, the control equipment CE1 is connected to a monitoring unit HAS1 and the control equipment CE2 to a monitoring unit HAS2. The two monitoring units, one of which will be described in more detail below, are designed in a similar way. The monitoring unit HAS1 is supplied continuously with measured values of the voltage of the alternating-voltage network N1, of the direct current in the dc connection, and of inlet and outlet temperatures of the cooling water of the rectifier, in a known manner, actual values of the control angle α and the extinction angle γ of the rectifier, formed in the control equipment, the power-direction signal RECT/INV, and in a manner not shown in the figure but known per se, input signals with information about the position of the tap-changer TC1. The monitoring unit HAS2 is supplied with corresponding measured values and signals relating to the inverter.

Each of the monitoring units generates blocking signals HTL and influencing signals HTH and HCC/HCR, which signals are supplied to the respective control equipment in a manner which will be described below.

Figure 4:
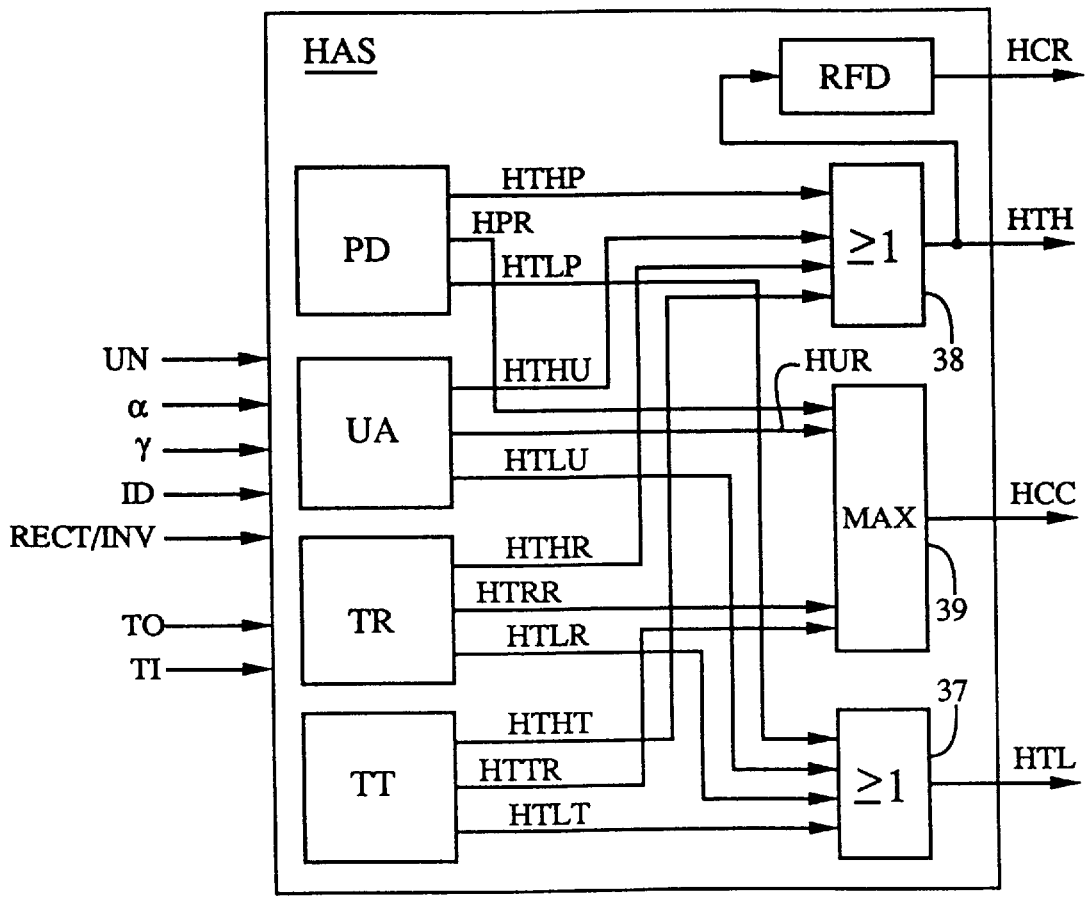
FIG. 4 shows in the form of a block diagram a monitoring unit according to the invention.

FIG. 4 shows a design of a monitoring unit HAS according to the invention. The monitoring unit comprises a first monitoring device PD for monitoring power losses in a damping circuit in a valve, a second monitoring device UA for monitoring a voltage stress on a surge arrester arranged at a valve, a third monitoring device TR for monitoring the temperature in a damping reactor, and a fourth monitoring device TT for monitoring temperature in a semiconductor element.

Each of the monitoring devices calculates a value of the respective stress parameter in dependence on supplied measured values and generates, in dependence on a comparison between the calculation result and at least one comparison value, at least one of the influencing signals to be described below.

Figure 5:
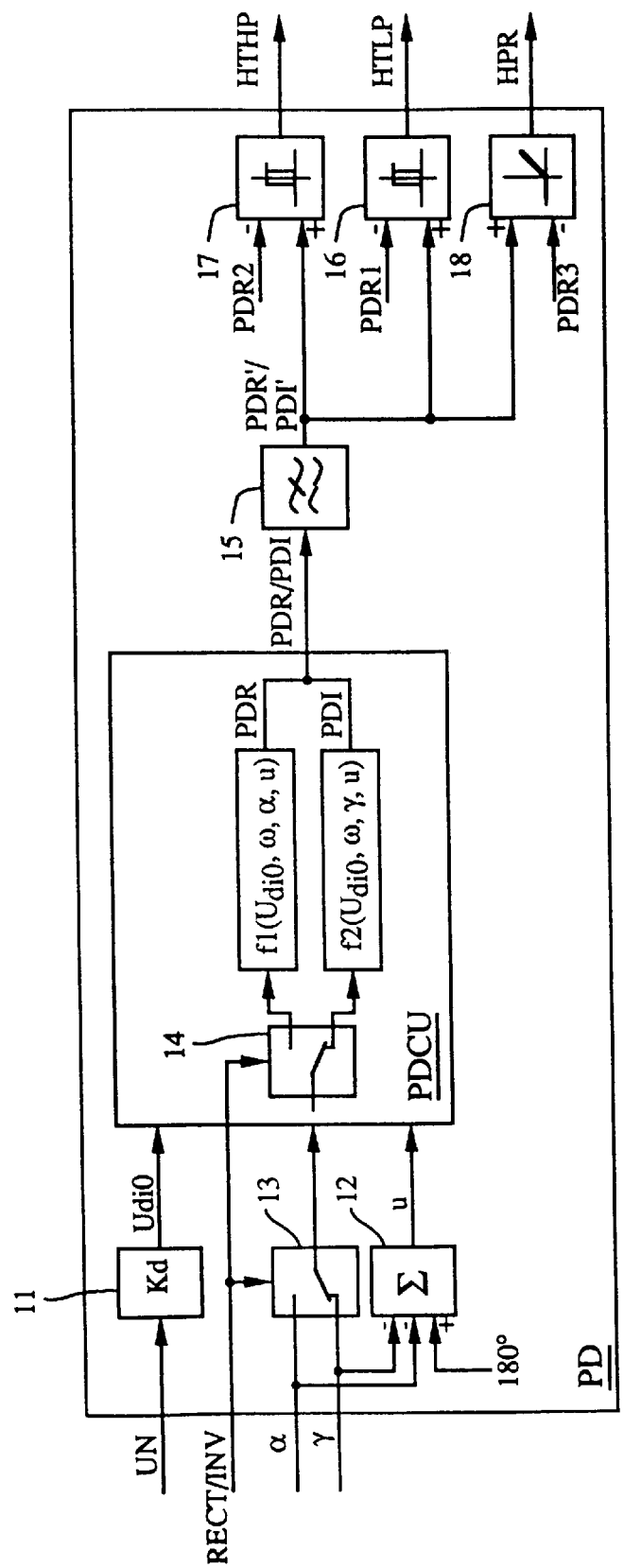
FIG. 5 shows in the form of a block diagram a monitoring device for power losses in a damping circuit.

FIG. 5 shows a design of the monitoring device PD for monitoring power losses in a damping circuit for a thyristor according to FIG. 3. The monitoring device is supplied with the measured value UN of the voltage Un of the ac network, actual values of the control angle α and the extinction angle γ, and the power-direction signal RECT/INV. The ideal no-load direct voltage Udi0 of the converter is calculated by multiplication of the measured value UN by a constant Kd in a multiplier 11. The constant Kd is chosen in a manner known per se, but not shown in detail in the figure, while taking into consideration the connection of the converter, the transformer ratio, and the actual tap-changer position. The overlap angle u for the commutating procedure is calculated in a summator 12 from the relationship which, by definition, is u=180°−α−γ. The ideal no-load direct voltage Udi0, the overlap angle u, the power-direction signal RECT/INV and, in dependence on this signal, either of the control angle α and the extinction angle γ, are supplied to a first calculating member PDCU for calculating the power loss in a damping circuit. A selector 13, controlled by the power-direction signal, indicates in the figure which of the control and extinction angles are supplied to the calculating member. When the power-direction signal indicates rectifier operation, the control angle α is supplied via the selector to the calculating member, and when the power-direction signal indicates inverter operation, the extinction angle γ is supplied via the selector to the calculating member.

Further, the calculating member is adapted so that, in inverter operation, the power loss, in this operating case designated PdR, is calculated based on a first relationship f1 and, in inverter operation, the power loss, in this operating case designated PdI, is calculated based on a second relationship f2. This is marked in the figure by a selector 14, controlled by the power-direction signal, for selection of the respective relationship. The relationships f1 and f2 are of the following conventional formula $$f1 = K11 * Udi0^2[K12*(\sin^2\alpha + \sin^2(\alpha+u)) + K13[K14+K15(\sin 2\alpha + \sin 2(\alpha+u) - 2u)] \quad (1)$$

$$f2\ 32\ K11 * Udi0^2[K12*(\sin^2\gamma + \sin^2(\gamma+u)) + K13[K14 - K15(\sin 2\gamma + \sin 2(\gamma+u) + 2u)] \quad (2)$$

where $$K11 = \frac{\pi}{36n^2} * \omega C(K_d)^2,$$

K12=7k/4,

K13=ωRC, K14=4π/3−√3/2, K15=7/8, n=the number of series-connected thyristors in the valve, ω=the angular frequency of the alternating-voltage network, C and R are the capacitance and resistance, respectively, of the damping circuit, and Kd and k, respectively, are correction factors.

The calculating member is adapted, in a known manner, to carry out the calculation based on the above-mentioned relationships in dependence on supplied values and stored constants.

The constants K11–K15 are selected based on parameters known to the installation and entered into the calculating member in a manner known per se and appropriate for the purpose.

It is understood that the calculating member may comprise sub-members common to both the rectifier and inverter cases for calculating terms which are of the same kind in both cases, and that the selector 14 shown in the figure can thereby control only sign reversals between various terms.

The calculating member delivers a signal PDR and PDI, respectively, corresponding to the calculated loss power, which signal is supplied to a low-pass filter 15 with a characteristic appropriately selected e.g. the purpose, for corresponding to a time constant which may advantageously be selected to be in the order of magnitude of 30–60 seconds. The output signal PDR' and PDI', respectively, from the low-pass filter is supplied to a first comparator 16, a second comparator 17, and a regulator 18 for comparison with a first comparison value PDR1, a second comparison value PDR2, and a third comparison value PDR3, respectively. The second comparison value is greater than the first and the third may advantageously be chosen equal to the second. In the event that the filtered calculated value of the loss power exceeds the respective comparison values of the comparators in magnitude, the first comparator delivers a blocking signal HTLP and the second an influencing signal HTHP. The regulator delivers an influencing signal HPR in dependence on the difference between the comparison value PDR3 and the filtered calculated value of the loss power if the latter exceeds the comparison value in magnitude, but the regulator comprises a limitation such that the influencing signal HPR otherwise remains zero.

Figure 6:
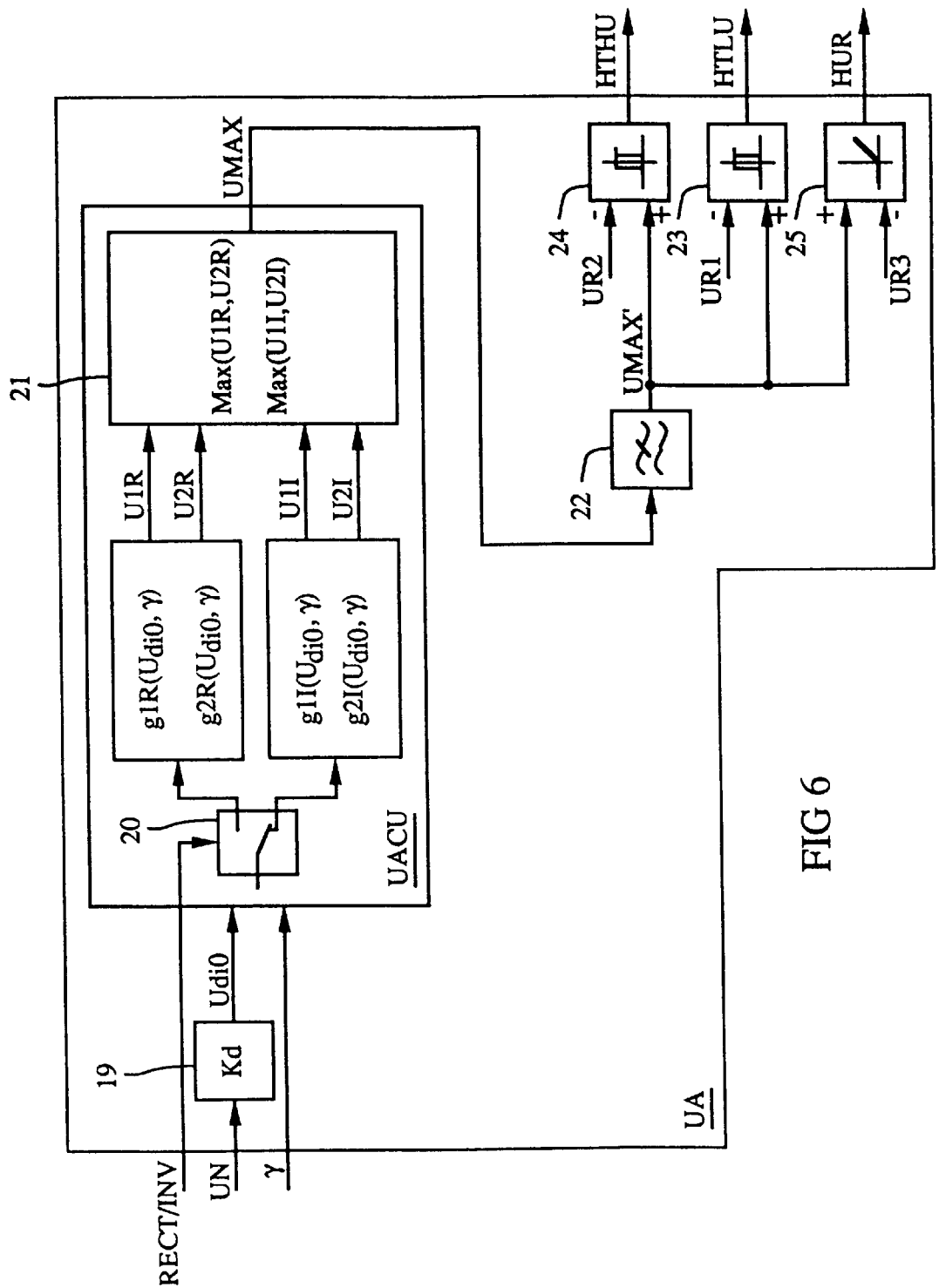
FIG. 6 shows in the form of a block diagram a monitoring device for voltage stress on a surge arrester.

FIG. 6 shows an embodiment of the monitoring device UA for monitoring a voltage stress UAmax on the surge arresters arranged in the valves during decommutation of the valves. The monitoring device is supplied with the measured value UN of the voltage Un of the ac network, an actual value of the extinction value γ, and the power-direction signal RECT/INV. The ideal no-load direct voltage Udi0 of the converter is calculated in a multiplier 19 in a manner similar to that described above.

The ideal no-load direct voltage Udi0, the power-direction signal RECT/INV, and the extinction angle γ are supplied to the calculating member UACU for calculating the voltage stress as will be described in greater detail below.

The calculating member is adapted so that the voltage stress UAmax in rectifier operation is calculated on a relationship UAmax=max{g1R, g2R} and in inverter operation based on a relationship UAmax=max{g1I, g2I}.

The relationships g1R, g2R, g1I and g2I are of the following conventional formula $$g1R = (1 + CCr)\frac{\pi}{3} Udi0 * \sin\gamma \quad (3)$$

$$g2R = \frac{\pi}{3} OFr * CCr * Udi0 * \sin\gamma + \frac{\pi}{3} Udi0 * |\sin(\gamma - 60°)| \quad (4)$$

$$g1I = (1 + CCi)\frac{\pi}{3} Udi0 * \sin\gamma \quad (5)$$

$$g2I = \frac{\pi}{3} OFi * CCi * Udi0 * \sin\gamma + \frac{\pi}{3} Udi0 * |\sin\gamma + 60°| \quad (6)$$

The selection of the respective set of relationships is marked in the figure by a selector 20 controlled by the power-direction signal.

The calculating member is adapted, in a manner known per se, to carry out the calculation based on the above-mentioned relationships in dependence on supplied values and inserted constants.

The constants CCr and CCi denote the peak value of the commutating overvoltage, and the constants OFr and OFi the peak value of that commutating overvoltage which, during the decommutation, is transformed to other valves. All of these constants are expressed in percentage of the voltage jump across the valve during decommutation and are selected on the basis of parameters known to the installation and inserted into the calculating member in a manner known per se and appropriate for the purpose. Typical values of the constants CCr and CCi are in the order of magnitude of 50% and, for the constants OFr and OFi, of the order of magnitude of 35–65%.

The values of U1R, U2R, thus calculated in dependence on Udi0 and γ during rectifier operation, or the values of U1I, U2I, calculated during inverter operation, and corresponding to the relationships g1R, g2R, g1I and g2I, respectively, are supplied to a selector 21 which is comprised in the calculating member. This selects the greatest of U1R, U2R, or the greatest of U1I, U2I, which value, designated UMAX, is supplied to a low-pass filter 22 of the same kind as the filter 15 described in connection with the description of the monitoring device PD. The output signal UMAX' from the low-pass filter is supplied to a first comparator 23, a second comparator 24 and a regulator 25 for comparison with a first comparison value UR1, a second comparison value UR2, and a third comparison value UR3, respectively. These comparators, the regulator and the respective comparison values are arranged in a manner analogous to that described in connection with the monitoring device PD, and the first comparator delivers, under corresponding conditions, a blocking signal HTLU and the second an influencing signal HTHU. The regulator delivers an influencing signal HUR.

It is to be understood that the calculating member may comprise sub-members common to both the rectifier and inverter cases for calculating terms which are of the same kind in both cases and that the selector 20 described in the figure can thereby control only reversals between various terms.

Figure 7:
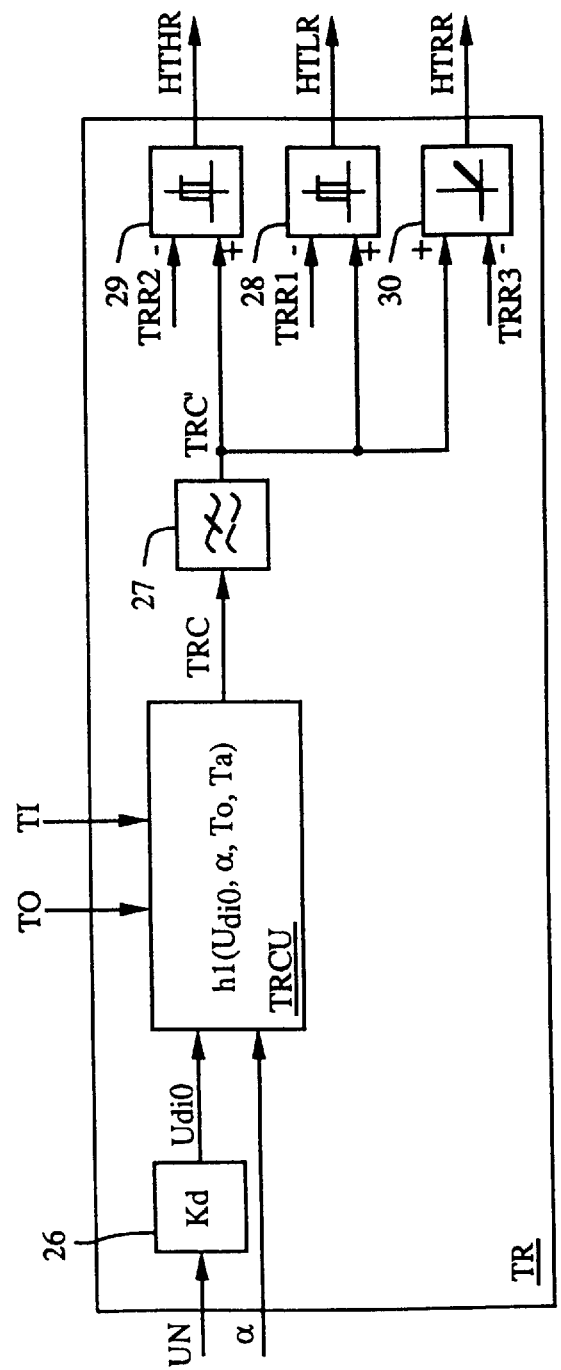
FIG. 7 shows in the form of a block diagram a monitoring device for the temperature in a damping reactor.

FIG. 7 shows an embodiment of the monitoring device TR for monitoring the temperature Tr of the damping reactor. The monitoring device is supplied with the measured value UN of the voltage Un of the ac network, an actual value of the control angle α, and measured values TI of the temperature Ti of the cooling water which is supplied to a valve and TO of the temperature To of the cooling water which leaves the valve. The ideal no-load direct voltage Udi0 of the converter is calculated in a multiplier 26 in a manner similar that that described above. The ideal no-load direct voltage Udi0 and the control angle a are supplied to the calculating member TRCU for calculating the reactor temperature Tr.

The calculating member is adapted such that a value TRC of the reactor temperature Tr is calculated taking into consideration the remagnetization losses of the reactor based on a relationship h1, which is of the following conventional formula $$h1 = Kr*Udi0*\sin\alpha*(1-e^{t/\tau}) + (3Ti+To)/4 \tag{7}$$

where Kr is a constant and τ is the thermal time constant of the reactor.

In a known manner, the calculating member is adapted to carry out the calculation based on the above-mentioned relationships in dependence on supplied values and inserted constants.

The constants are selected on the basis of parameters known to the installation and entered into the calculating member in a manner known per se and appropriate for the purpose.

The value of TRC thus calculated is supplied to a low-pass filter 27 of the same kind as the filter 15 described in connection with the description of the monitoring device PD. The output signal TRC' from the low-pass filter is supplied to a first comparator 28, a second comparator 29, and a regulator 30 for comparison with a first comparison value TRR1, a second comparison value TRR2 and a third comparison value TRR3, respectively. These comparators, the regulator and the respective comparison values are arranged in a manner analogous to that described above in connection with the monitoring device PD, and the first comparator delivers, under corresponding conditions, a blocking signal HTLR and the second delivers an influencing signal HTHR. The regulator delivers an influencing signal HTRR.

Figure 8:
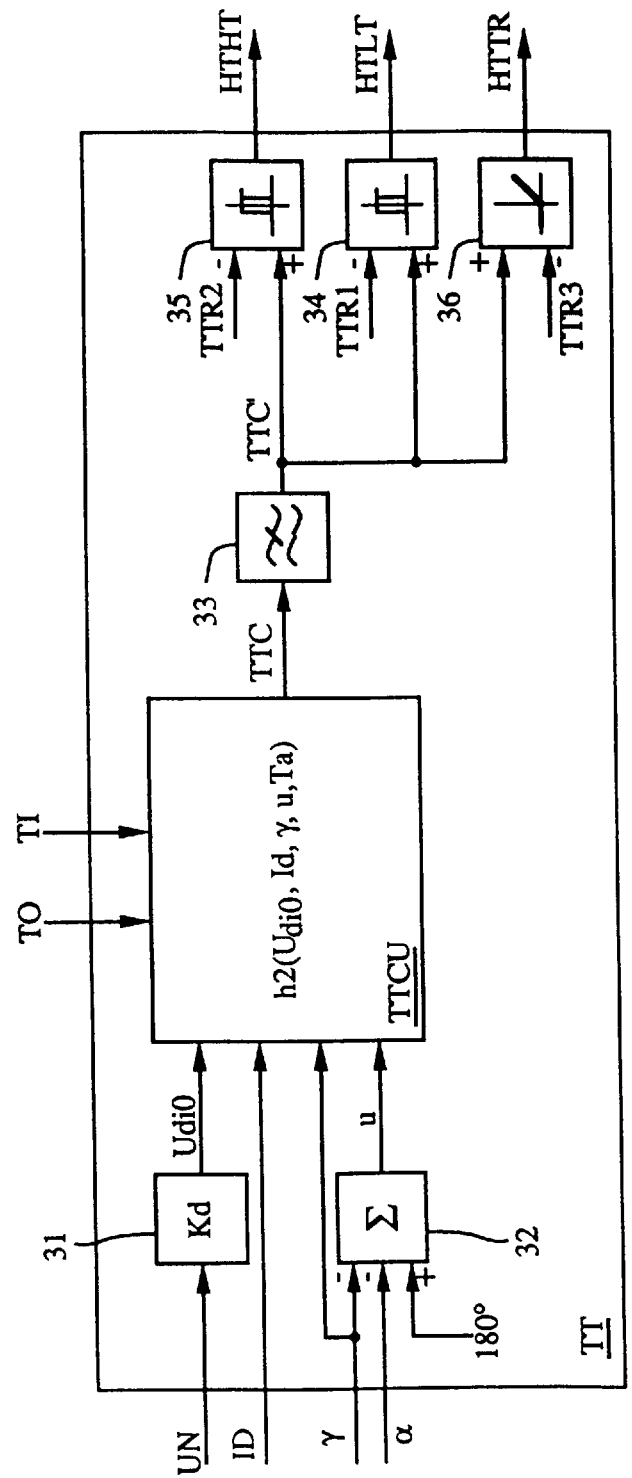
FIG. 8 shows in the form of a block diagram a monitoring device for the temperature in a semiconductor element.

FIG. 8 shows an embodiment of the monitoring device TT for monitoring the temperature Tt of a semiconductor element. The monitoring device is supplied with the measured value UN of the voltage Un of the ac network, the measured value ID of the direct current Id, actual values of the control angle α and the extinction angle γ as well as measured values TI of the temperature Ti of the cooling water which is supplied to a valve and TO of the temperature To of the cooling water which leaves the valve. The ideal no-load direct voltage Udi0 of the converter and the overlap angle u are calculated in a multiplier 31 and a summator 32, respectively, in a manner similar to that described above.

The ideal no-load direct voltage Udi0, the measured value ID of the direct current, the overlap angle u, and the extinction angle γ are supplied to a fourth calculating member TTCU for calculating the temperature Tt of the semiconductor element.

Then calculating member is adapted so that a value TTC of the temperature Tt is calculated taking into consideration the on-state losses of the semiconductor element and the losses during commutation, during firing and during extinction based on a relationship h2, which is of the following conventional formula $$h2 = (Ti+To)/2 + [K16*Id + K17*(Id)^2*(360-u)/360 + K18 + K19*(Udi0)^2*\sin^2\gamma*Zt \tag{8}$$

where K16–K19 are constants and Zt is the thermal impedance between semiconductor and cooling water.

The calculating member is adapted, in a known manner, to carry out the calculation based on the above-mentioned relationships in dependence on supplied values and inserted constants.

The constants are selected on the basis of parameters known to the installation and entered into the calculating member in some known manner and appropriate for the purpose.

The value TTC thus calculated is supplied to a low-pass filter 33 of the same kind as the filter 15 described in connection with the description of the monitoring device PD. The output signal TTC' from the low-pass filter is supplied to a first comparator 34, a second comparator 35, and a regulator 36 for comparison with a first comparison value TTR1, a second comparison value TTR2 and a third comparison value TTR3, respectively. These comparators, the regulator and the respective comparison values, are arranged in a manner analogous to that described above in connection with the monitoring device PD. The first comparator delivers, under the corresponding conditions, a blocking signal HTLT, and the second delivers an influencing signal HTHT. The regulator delivers an influencing signal HTTR.

The above-described blocking signals HTLP, HTLU, HTLR and HTLT from the respective first comparators are supplied to a first logic OR circuit 37 (FIG. 4). The OR circuit forms an output signal, a blocking signal HTL, if any of the blocking signals HTLP, HTLU HTLR and HTLT occurs.

The above-described influencing signals HTHP, HTHU, HTHR and HTHT from the respective second comparators are supplied to a second OR circuit 38 (FIG. 4). The OR circuit forms as output signal an influencing signal HTH if any of the influencing signals HTHP, HTHU, HTHR and HTHT occurs.

The above-described influencing signals HPR, HUR, HTRR and HTTR from the respective regulators are supplied to a selector 39 (FIG. 4), which selects the greatest of the supplied influencing signals. The output signal of the selector is hereinafter referred to as the influencing signal HCC.

The influencing signal HTH from the second logic OR circuit 38 is supplied to a ramp function device RFD which is arranged in the monitoring unit HAS and which forms an influencing signal HCR.

Figure 9:
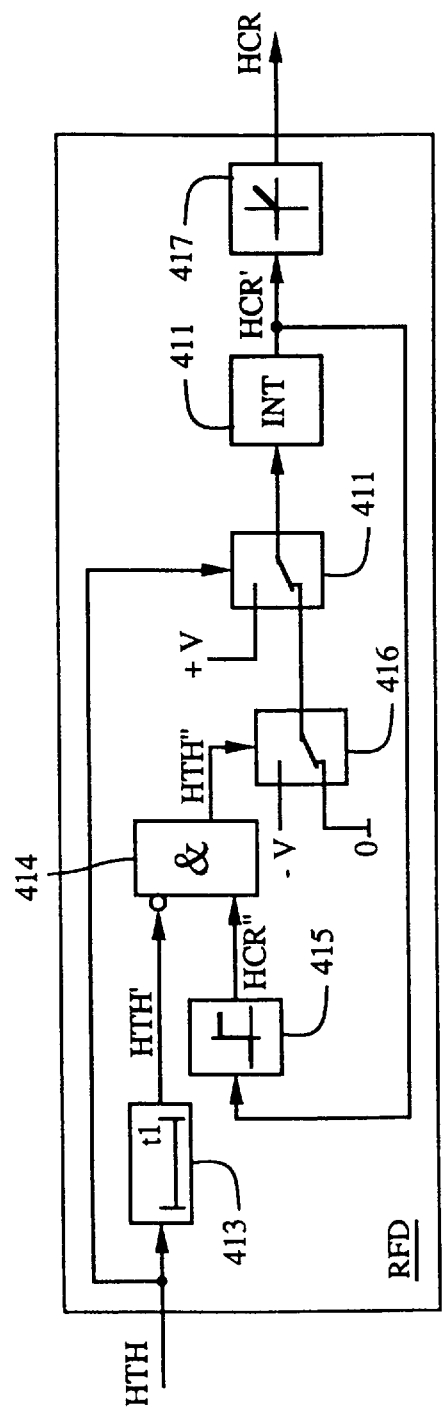
FIG. 9 shows in the form of a block diagram an embodiment for forming an influencing signal.

An embodiment of the ramp function device is shown in FIG. 9. When the influencing signal HTH is supplied to a selector 411, this connects a positive voltage, in the figure designated +V, to the input of an integrator 412, which generates on its output an output signal HCR' with a predetermined time rate of change. The output signal of the integrator is supplied to a limiting circuit 417, the output signal of which constitutes the influencing signal HCR and which is limited to positive values. The influencing signal HTH is also supplied to a delay element 413, the output signal HTH' of which is supplied to an inverting input of an AND circuit 414. When the influencing signal HTH is supplied to the delay element, its output signal HTH' is formed immediately whereas when the influencing signal HTH disappears, the output signal HTH' disappears with a preselected time delay t1, which may typically be in the order of magnitude of 10 minutes. The output signal HRC' from the integrator is supplied to a comparator 415 which, when the output signal of the integrator is greater than zero, forms a signal HCR", which is supplied to another output of the AND circuit 414. The output signal HTH" from the AND circuit is supplied to a selector 416 which, when the signal HTH" occurs, connects a voltage −V to its output, otherwise the voltage zero to its output. The output from the selector 416 is connected to an input of the selector 411 such that, when the influencing signal HTH does not occur, the output from the selector 416 is connected to the input of the integrator. The function of the ramp function device is therefore such that, when the influencing signal HTH is formed, the output signal of the integrator starts increasing at predetermined rates of change. When the influencing signal HTH disappears as a result of an influence from the influencing signal HCR on the control equipment of the converter, which will be described in greater detail below, or for some other reason, the voltage zero is connected to the input of the integrator. After the time t1, the AND circuit 414 is opened to the output signal HCRN from the comparator 415, whereby the voltage −V is connected to the input of the integrator. The output signal of the integrator starts decreasing at its predetermined time rate of change. When the output signal of the integrator becomes zero, the output signal from the selector 415 disappears and the selector 416 connects the voltage zero to the input of the integrator.

Figure 10:
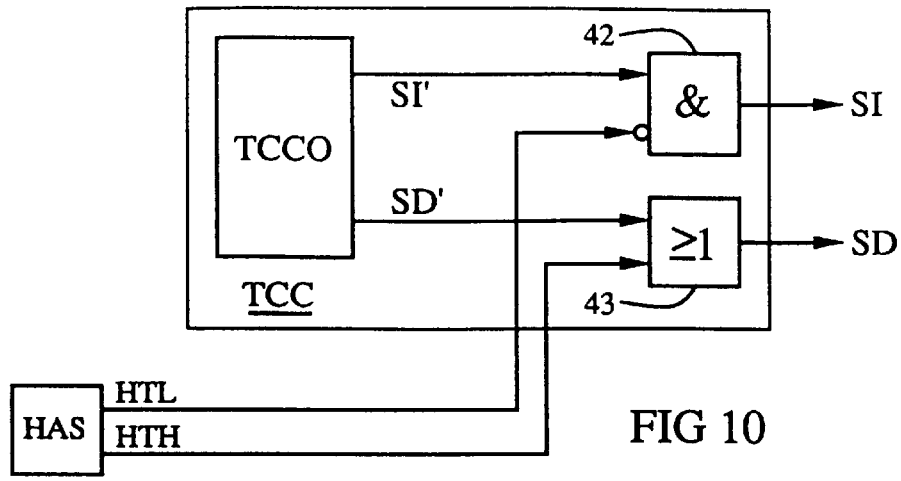
FIG. 10 shows in the form of a block diagram an embodiment for influencing a tap-changer control unit.

FIG. 10 schematically shows an embodiment of a tap-changer control unit TCC. Parts thereof, which are adapted in a manner known per se to generate INCREASE signals SI' and DECREASE signals SD', respectively, to the operating equipment of the tap-changer, are indicated in the figure by a block TCCO. An INCREASE signal means that the tap-changer steps in a direction which provides increasing ideal no-load direct voltage. The blocking signal HTL described above is supplied to an inverting input of an AND circuit 42. The INCREASE signal SI' is supplied to another input of the AND circuit. The AND circuit generates an INCREASE signal SI, which is supplied to the operating equipment of the tap-changer. When the blocking signal HTL occurs, the INCREASE signal SI' is thus blocked and, as long as the blocking signal HTL remains, the tap-changer cannot be stepped towards increasing the ideal no-load direct voltage. The above-described influencing signal HTH is supplied to an OR circuit 43. The DECREASE signal SD' is supplied to another input on the OR circuit 43. This OR circuit generates as an output signal a DECREASE signal SD, which is supplied to the operating equipment of the tap-changer. When the influencing signal HTH is present, DECREASE signals are thus delivered to the tap-changer while at the same time INCREASE signals are blocked. The first comparison value for generating the blocking signal HTL is advantageously chosen so much lower than the second comparison value for generating the influencing signal HTH that the difference in levels corresponds to about 1.5 steps in the tap-changer. In this way, it is avoided that, for example, a DECREASE signal SD caused by the influencing signal HTH and an INCREASE signal SI' caused by the control equipment of the converter result in the tap-changer continuously changing between two positions, so called hunting.

Figure 11:
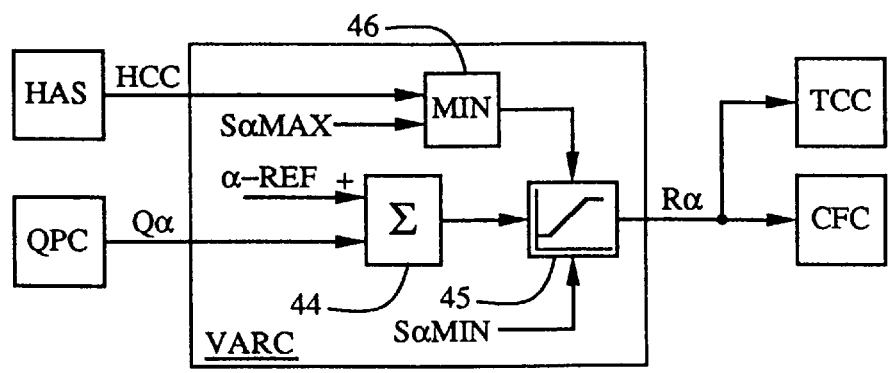
FIG. 11 shows in the form of a block diagram an embodiment for influencing a reference value control unit.

FIG. 11 shows part of a reference value control unit VARC, which comprises a summator 44, the output signal of which is supplied to a limiting member 45 with limiting values capable of being influenced, in which the output signal of the summator is limited to an upper and a lower value. The summator 44 is supplied with a correction signal Qα from the control unit QPC for control of reactive power exchange with the alternating-voltage network as well as a reference value α-REF for the control angle of the rectifier, generated in a manner known per se. A limiting-controlling signal SαMAX, formed in some way known per se, for example in dependence on the direct current Id, and the influencing signal HCC described above are supplied to a selector 46, which selects and forwards to the limiting circuit 45 that of the two signals which provides the lowest limiting value of the control angle α. The output signal Rα from the limiting circuit is supplied to the control unit CFC for control angle and extinction angle control and the tap-changer control unit TCC as reference values therefor. By selecting a high amplification in the above-described regulators 18, 25, 30 and 36, the influencing signal HCC will be able to override the limiting-controlling signal SαMAX and hence reduce the reference value Rα for the control of the converter such so that the stress on the component in question in the valve is reduced.

Figure 12:
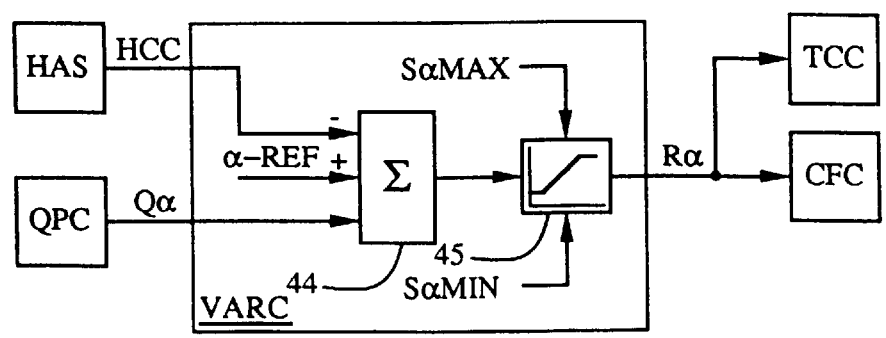
FIG. 12 shows in the form of a block diagram another embodiment for influencing a reference value control unit.

FIG. 12 shows parts of the reference value unit VARC corresponding to those in FIG. 11 in another embodiment of the invention, in which the influencing signal HCC is supplied to the summator 44 with an opposite sign in relation to the reference value α-REF. By choosing a high amplification in the above-described regulators 18, 25, 30 and 36, the influencing signal HCC will reduce the reference value Rα for the control unit CFC for control angle and extinction angle control and for the tap-changer control unit TCC so that the stress on the component in question in the valve is reduced.

The devices described with reference to FIGS. 11 and 12 are also applicable to the inverter, whereby the control angle α and the index α in the described signals are replaced by the extinction angle γ and the index γ, respectively.

Figure 13:
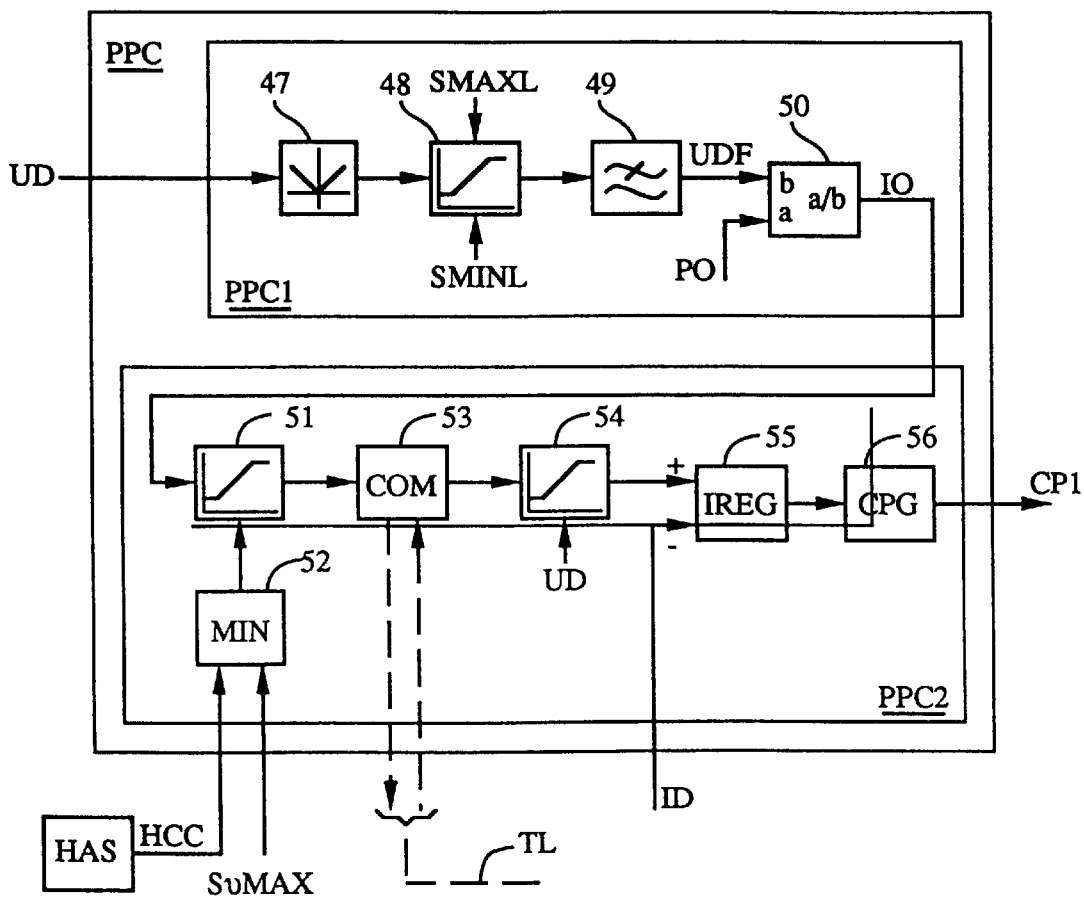
FIG. 13 shows in the form of a block diagram an embodiment for influencing a power control unit.

FIG. 13 shows a power control unit PPC for control of transmitted power in the installation, included in the control unit CFC for control angle and extinction angle control. The power control unit comprises a first part PPC1 for forming a current order IO and a second part PPC2 for forming the control pulses CP1 in dependence on the current order. In a manner known per se, the measured value UD of the voltage Ud is supplied to a value-forming member 47, which forms the absolute value of the measured value of the voltage. The absolute value is supplied to a first limiting member 48, the output signal of which is supplied to a low-pass filter 49. The output signal from the low-pass filter forms a calculating value UDF of the direct voltage Ud, which is supplied to a quotient-forming member 50. The quotient-forming member is also supplied with a power order PO for ordered transmitted active power in the installation and forms as output signal a current order IO as the quotient between the power order PO and the calculating value UDF.

The current order is supplied to a second limiting member 51 with limiting values capable of being influenced, in which the current order is limited to an upper and a lower value. A limiting-controlling signal SvMAX, formed in some way known per se: for example in dependence on the cooling water temperature of the valve, and the above-described influencing signal HCC are supplied to a selector 52, which selects and forwards to the limiting circuit 51 that of the two signals which provides the lowest limiting value of the current order IO. The output signal from the limiting circuit is supplied to a synchronization member 53, in which the current orders for the two converters are synchronized via the telecommunication link TL, and thereafter to a limiting member 54 for limiting the current order in dependence on the measured value UD of the direct voltage Ud, which measured value is supplied to the above-mentioned limiting member. The output signal from the limiting member 54 is then supplied to a current regulator 55 as reference value therefor. In dependence on the difference between the reference value and a measured value ID of the direct current Id, which measured value is supplied to the current regulator, the current regulator generates a control signal which is supplied to a control-pulse generating member 56, the output signal of which constitutes control pulses CP1 for the valves of the converter. By selecting a high amplification in the above-described regulators 18, 25, 30 and 36, the influencing signal HCC will be able to override the limiting-controlling signal SvMAX and hence reduce the reference value of the current regulator such that the stress on the component in question in the valve is reduced.

Figure 14:
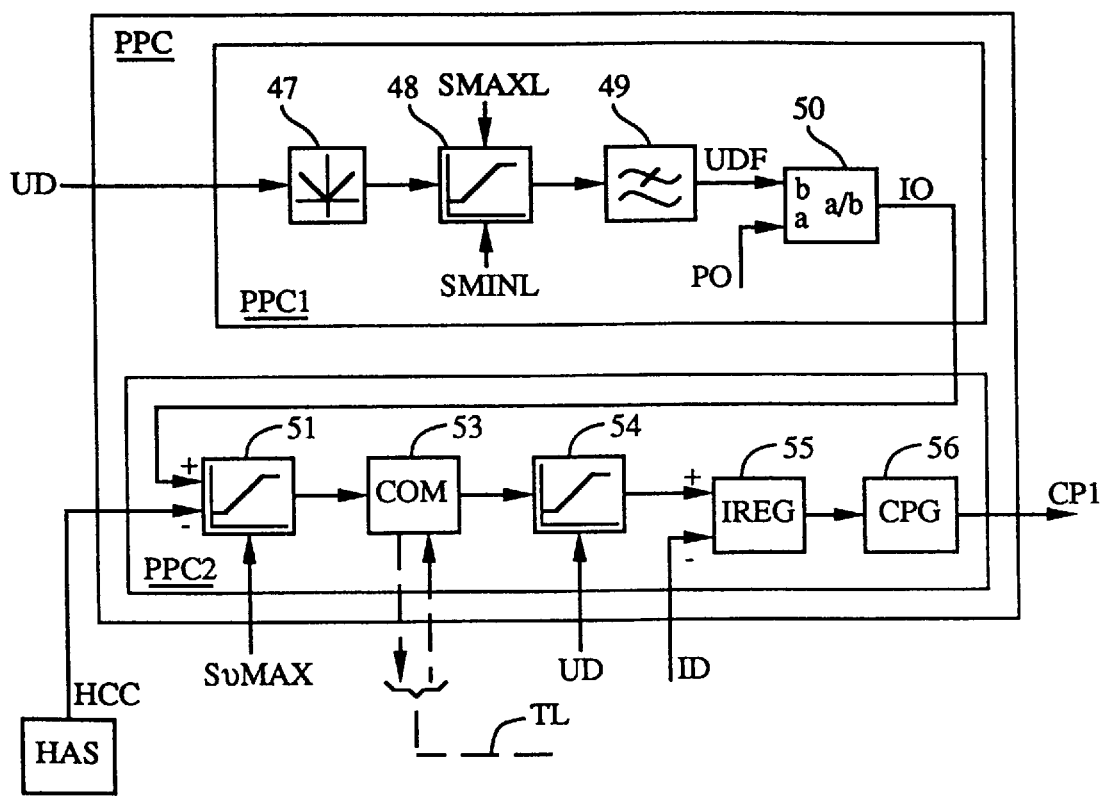
FIG. 14 shows in the form of a block diagram another embodiment for influencing a power control unit.

FIG. 14 shows a power control unit of the same kind as that shown in FIG. 13 in another embodiment of the invention, in which the influencing signal HCC is supplied to the limiting circuit 51 with a sign opposite to that of the current order IO. By selecting a high amplification in the above-described regulators 18, 25, 30 and 36, the influencing signal HCC will reduce the current order so that the stress on the component in question in the valve is reduced.

The invention is not limited to the embodiments shown but a plurality of modifications are feasible within the scope of the inventive concept.

It is to be understood that the ramp function device RFD described with reference to FIGS. 4 and 9 and the regulators described with reference to FIGS. 5–8 advantageously constitute alternative embodiments of the invention and that in the means described with reference to FIGS. 11, 12, 13 and 14, the influencing signal HCC may be replaced, where appropriate, by the influencing signal HRC, formed by the ramp function device RFD.

The monitoring unit may comprise one or more of the monitoring devices described, and influencing signals may be supplied to one or more of the tap-changer control unit CT, the control unit CFC for control angle and extinction angle control, and the reference value control unit VARC. A monitoring device may comprise only one of the described comparators and/or only the described regulator and it is possible, by suitable scaling of the output signals from the calculating members, which output signals are supplied to a selector for selecting the greatest of the output signals, to use a comparator and/or regulator common to the calculating members.

By means of measures known to one skilled in the art, an embodiment of the invention may advantageously be designed so that, in dependence on a first comparison value, influence is exerted on the tap-changer control unit TCC: in dependence on a second comparison value, greater than the first one, influence is exerted on the reference value control unit VARC: and in dependence on a third comparison value, greater than the second one, influence is exerted on the control unit CFC for control angle and extinction angle control. Similarly, by means of measures known to one skilled in the art, an embodiment of the invention may advantageously be constructed so that influence is exerted on any of the above-mentioned control units in dependence on a specific monitoring device, selected for this influence, for example so that, in dependence on too high a voltage stress, influence is exerted primarily on the reference control unit only.

Influencing signals emanating from the comparators of the monitoring devices may influence any of the described limiting circuits so that the limiting value is reduced by a predetermined amount. In this case, the lower limiting value may remain for as long as the influencing signal remains or, if, for example, the reason for the stress parameter exceeding its predetermined value is an ordered increase of the reference value for a control angle or an extinction angle, for as long as the order for increase remains or for as long as the difference between the actual value of the respective angle and the ordered angle exceeds a predetermined value.

Alarm signals may be formed in dependence on a predetermined comparison value for each of the described stress parameters or in common, when any influencing signal has been formed, and is signalled and registered in some way known per se.

In the embodiments, the overlap angle is calculated based on the relationship overlap angle (u)+control angle ($\alpha$)+ extinction angle ($\gamma$)=180°. Within the scope of the inventive concept, the overlap angle may also be calculated with other relationships, known per se, for exampe1 based on the current Id.

When calculating power losses in the damping circuit, the angular frequency $\omega$ of the alternating-voltage network is included as a value entered in connection with the calculations. It is also within the scope of the inventive concept instead to continuously measure the actual value of the power frequency and to form the calculation result in dependence on the measured value.

The calculation of the ideal no-load direct voltage Udi0 and the overlap angle u may, of course, advantageously be carried out in calculating members common to the monitoring devices and arranged for this purpose in the monitoring unit or elsewhere.

The expression for calculation of the respective stresses on the valve, as used in the monitoring devices, may be modified within the scope of the inventive concept. Such a modification may, of course, also be carried out for adaptation to semiconductor couplings other couplings than those described here.

The semiconductor elements may comprise thyristors but also other types of controllable semiconductor elements such as, for example, gate turn-off thyristors, so-called GTO, and bistable transistors with an insulated control gate, so-called IGBT. The damping circuits are replaced in these cases by auxiliary circuits adapted for these semiconductor types. The expressions used for the power development in the damping circuits may, of course, be modified especially in this case.

Other cooling media than water may, of course, be utilized within the scope of the inventive concept for cooling the valve.

The calculating members, filters, comparators, regulators, etc., included in the device may be realized wholly or partially as hard-wired, analog-working or digital-working circuits, or in microprocessors programmed for the particular purpose.

We claim:

1. A device for control of an installation for transmission of high-voltage direct current in dependence on at least one stress parameter for a valve in a converter included in the installation and controlled by a piece of control equipment (CE1, CE2), which stress parameter is any of power losses (PdR, PdI) in a damping circuit (RD, CD), a voltage stress (UAmax) on a surge arrester (A), the temperature (Tr) in a damping circuit (LD), and the temperature (Tt) in a semiconductor element (T1, T2, . . . Tn), wherein the control equipment comprises a tap-changer control unit (TCC), wherein the device (HAS) comprises a monitoring device (PD, UA, TR, TT) for continuously calculating, based on predetermined relationships (f1, f2, g1R, g2R, g1I, g2I, h1, h2) and in dependence on supplied values (UN, α, γ, ID, TO, TI, RECT/INV) of the operating parameters of the installation, a value (PDR, PDI, UMAX, TRC, TTC) of the stress parameter and for comparing the calculated value with at least one comparison value, and that the device in dependence on the comparison generates at least one influencing signal (HTH, HCC, HCR), which influencing signal (HTH) is supplied to said tap-changer control unit to step the tap-changer in a direction towards a decreasing ideal no-load direct voltage (Udi0).

2. A device according to claim 1, wherein the stress parameter are power losses in a damping circuit, wherein the monitoring device (PD) comprises a calculating member (PDCU) for calculating a value (PDR, PDI) of the power loss (PdR, PdI) in dependence on the ideal no-load direct voltage (Udi0) of the converter, its overlap angle (u), and, when operating in rectifier operation, its control angle (α) and, when operating in inverter operation, its extinction angle (γ), respectively.

3. A device according to claim 2, wherein the calculating member carries out the calculation based on a relationship $$f1 = K11*Udi0^2[K12*(\sin^2\alpha + \sin^2(\alpha+u)) + +K13[K14+K15(\sin2\alpha + \sin2(\alpha+u)-2u)],$$

when the converter operates in rectifier operation, and based on a relationship $$f2 = K11*Udi0^2[K12*(\sin^2\gamma + \sin^2(\gamma+u)) + +K13[K14-K15(\sin2\gamma + \sin2(\gamma+u)+2u],$$

when the converter operates in inverter operation.

4. A device according to claim 1, wherein the stress parameter is a voltage stress on a surge arrester, and wherein the monitoring device (UA) comprises a calculating member (UACU) for calculating a value (UMAX) of the voltage stress (UAmax) in dependence on the ideal no-load direct voltage (Udi0) of the converter and its extinction angle (γ).

5. A device according to claim 4, wherein the calculating member carries out the calculation based on a relationship $$UAmax = max\{g1R, g2R\},$$

when the converter operates in inverter operation, and based on a relationship $$UAmax = max\{g1I, g2I\},$$

when the converter operates in inverter operation, and wherein $$g1R = (1 + CCr)\frac{\pi}{3} Udi0 * \sin\gamma,$$

$$g2R = \frac{\pi}{3} OFr * CCr * Udi0 * \sin\gamma + \frac{\pi}{3} Udi0 * |\sin(\gamma - 60°)|$$

$$g1I = (1 + CCi)\frac{\pi}{3} Udi0 * \sin\gamma,$$

$$g2I = \frac{\pi}{3} OFi * CCi * Udi0 * \sin\gamma + \frac{\pi}{3} Udi0 * |\sin(\gamma + 60°)|$$

6. A device according to claim 1, wherein the stress parameter is the temperature in a damping circuit, and wherein the valve is cooled by a cooling medium, and wherein the monitoring device (TR) comprises a calculating member (TRCU) for calculating a value (TRC) of the temperature (Tr) in dependence on the ideal no-load direct voltage (Udi0) of the converter, its control angle (α), the temperature (Ti) of the cooling medium when being supplied to the valve, and the temperature (To) of the cooling medium when leaving the valve.

7. A device according to claim 6, wherein calculating member carries out the calculation based on a relationship $$h1 = Kr*Udi0*\sin\alpha*(1-e^{t/96}) + (3Ti+To)/4.$$

8. A device according to claim 1, wherein the stress parameter is the temperature in a semiconductor element, and wherein the valve is cooled by a cooling medium, and wherein the monitoring device (TT) comprises a calculating member (TTCU) for calculating a value (TTC) of the temperature (Tt) in dependence on the ideal no-load direct voltage (Udi0) of the converter, its direct current (Id), its overlap angle (u), its extinction angle (γ), the temperature (Ti) of the cooling medium when being supplied to the valve, and the temperature (To) of the cooling medium when leaving the valve.

9. A device according to claim 8, wherein the calculating member carries out the calculation based on a relationship $$h2 = (Ti+To)/2 + [K16*Id+K17*(Id)^2*(360-u)/360+K18+K19*(Udi0)^2*\sin^2\gamma*Zt.$$

10. A device according to claim 1, wherein the control equipment of the converter comprises a power control unit (PPC), which control unit generates a current order (IO) for the converter, and wherein the influencing signal (HCC, HCR) is supplied to said control unit for influencing a limiting circuit (52) for the current order.

11. A device according to claim 1, wherein the control equipment of the converter comprises a power control unit (PPC), which control unit generates a current order (IO) for the converter, wherein the influencing signal (HCC, HCR) is supplied to said control unit for reducing the current order.

12. A device according to claim 1, wherein the control equipment of the converter comprises a control unit (CFC) for control of at least one of control angle and extinction angle and, in addition, a reference value control unit (VARC) for generating and supplying a reference value (Rα and Rγ, respectively) for control angle and extinction angle control, respectively (α and γ, respectively) for at least any of the other control units mentioned, any wherein the influencing signal (HCC, HCR) is supplied to the reference value control unit for influencing a limiting circuit (45) for the reference value generated thereby.

13. A device according to claim 1, wherein the control equipment of the converter comprises a control unit (CFC) for control of at least one of control angle and extinction angle and, in addition, a reference value control unit (VARC) for generating and supplying a reference value (Rα and Rγ, respectively) for control angle and extinction angle control, respectively (α and γ, respectively) for at least any of the other control units mentioned, wherein the influencing signal (HCC, HCR) is supplied to the reference value control unit for reducing the reference value generated thereby.

14. A device according to claim 10, wherein it comprises a regulator (18, 25, 30, 36) which generates the influencing signal (HCC) in dependence on the difference between the calculated value of the stress parameter and its comparison value (PDR3, UR3, TRR3, TTR3).

15. A device according to claim 10, wherein it comprises a ramp function device (RFD) which generates the influencing signal (HCR) in dependence on the difference between the calculated value of the stress parameter and its comparison value (PDR2, UR2, TRR2, TTR2).

16. A device according to claim 1 comprising at least two monitoring devices, and wherein it comprises a logic OR circuit (38) which forms the influencing signal (HTH) in dependence on influencing signals (HTHP, HTHU, HTHR, HTHT) emanating from any of the monitoring devices and formed in dependence on a comparison with comparison values (PDR2, UR2, TRR2, TTR2) associated with the respective stress parameter.

17. A device according to claim 14, comprising at least two monitoring devices, and wherein it comprises a selector (39) which forms the influencing signal (HCC) as the greatest of the influencing signals (HPR, HUR, HTRR, HTTR) emanating from a regulator in any of the monitoring devices.

18. A method for control of an installation for transmission of high-voltage direct current in dependence on at least one stress parameter for a valve in a converter included in the installation and controlled by a piece of control equipment (CE1, CE2), which stress parameter is any of power losses (PdR, PdI) in a damping circuit (RD, CD), a voltage stress (UAmax) on a surge arrester (A), the temperature (Tr) in a damping circuit (LD), and the temperature (Tt) in a semiconductor element (T1, T2, . . . Tn), wherein the control equipment comprises a tap-changer control unit (TCC), and wherein, based on predetermined relationships (f1, f2, g1R, g2R, g1I, g2I, h1, h2) and in dependence on measured values (UN, α, γ, ID, TO, TI, RECT/INV) of the operating parameters of the installation, a value (PDR, PDI, UMAX, TRC, TTC) of the stress parameter is continuously calculated, and wherein at least one influencing signal (HTH, HCC, HCR) is generated in dependence on a comparison between the calculated value and at least one comparison value for the parameter, and the influencing signal (HTH) is supplied to said tap-changer control unit to step the tap-changer in a direction towards a decreasing ideal no-load direct voltage (Udi0).

19. A method according to claim 18, wherein the stress parameter are power losses in a damping circuit, and wherein the value of the power loss is calculated in dependence on the ideal no-load direct voltage (Udi0) of the converter, its overlap angle (u), and, when operating in rectifier operation, its control angle (α) and, when operating in inverter operation, its extinction angle (γ), respectively.

20. A method according to claim 19, wherein the value of the power development is calculated based on a relationship $$f1 = K11 * Udi0^2 [K12 * (\sin^2\alpha + \sin^2(\alpha+u)) + K13[K14 + K15(\sin 2\alpha + \sin 2(\alpha+u) - 2u)],$$

when the converter operates in rectifier operation, and a relationship $$f2 = K11 * Udi0^2 [K12 * (\sin^2\gamma + \sin^2(\gamma+u)) + K13[K14 - K15(\sin 2\gamma + \sin 2(\gamma+u) + 2u)],$$

when the converter operates in inverter operation.

21. A method according to claim 18, wherein the stress parameter is a voltage stress on a surge arrester, and wherein the value of the voltage stress (UAmax) is calculated in dependence on the ideal no-load direct voltage (Udi0) of the converter and its extinction angle (γ).

22. A method according to claim 21, wherein the value of the voltage stress is calculated based on a relationship $$UAmax = max\{g1R, g2R\},$$

when the converter operates in rectifier operation, and a relationship $$UAmax = max\{g1I, g2I\},$$

when the converter operates in inverter operation, and where $$g1R = (1 + CCr)\frac{\pi}{3} Udi0 * \sin\gamma,$$

$$g2R = \frac{\pi}{3} OFr * CCr * Udi0 * \sin\gamma + \frac{\pi}{3} Udi0 * |\sin(\gamma - 60°)|$$

$$g1I = (1 + CCi)\frac{\pi}{3} Udi0 * \sin\gamma,$$

$$g2I = \frac{\pi}{3} OFi * CCi * Udi0 * \sin\gamma + \frac{\pi}{3} Udi0 * |\sin(\gamma + 60°)|$$

23. A method according to claim 18, wherein the stress parameter is the temperature in a damping reactor and wherein the valve is cooled by a cooling medium, and wherein the value of the temperature (Tr) is calculated in dependence on the ideal no-load direct voltage (Udi0) of the converter, its control angle (α), the temperature (Ti) of the cooling medium when being supplied to the valve, and the temperature (To) of the cooling medium when leaving the valve.

24. A method according to claim 23, wherein the value of the temperature (Tr) is calculated based on a relationship $$h1 = Kr * Udi0 * \sin\alpha * (1 - e^{t/\tau}) + (3Ti + To)/4.$$

25. A method according to claim 18, wherein the stress parameter is the temperature in a semiconductor element, and wherein the valve is cooled by a cooling medium, and wherein the value of the temperature (Tt) is calculated in dependence on the ideal no-load direct voltage (Udi0) of the converter, its direct current (Id), its overlap angle (u), its extinction angle (γ), the temperature (Ti) of the cooling medium when being supplied to the valve, and the temperature (To) of the cooling medium when leaving the valve.

26. A method according to claim 25, wherein the value of the temperature (Tt) is calculated based on a relationship $$h2 = (Ti+To)/2 + (K16 * Id + K17 * (Id)^2 * (360-u)/360 + K18 + K19 * (Udi0)^2 * \sin^2\gamma * Zt.$$

27. A method according to claim 18, wherein the control equipment of the converter comprises a power control unit (PPC), said control unit generating a current order (IO) for the converter, and wherein the influencing signal (HCC, HCR) is supplied to said control unit to influence a limiting circuit (52) for the current order.

28. A method according to claim 18, wherein the control equipment of the converter comprises a power control unit (PPC), said control unit generating a current order (IO) for the converter, and wherein the influencing signal (HCC, HCR) is supplied to said control unit to reduce the current order.

29. A method according to claim 18, wherein the control equipment of the converter comprises a control unit (CFC) for control of at least one of control angle and extinction angle and, in addition, a reference value control unit (VARC) for generating and supplying a reference value (R$\alpha$ and R$\gamma$, respectively) for control and extinction angles ($\alpha$ and $\gamma$, respectively) for any of the other control units mentioned, and wherein the influencing signal (HCC, HCR) is supplied to said reference value control unit to influence a limiting circuit (45) for the reference value generated thereby.

30. A method according to claim 18, wherein the control equipment of the converter comprises a control unit (CFC) for control of at least one of control angle and extinction angle and, in addition, a reference value control unit (VARC) for generating and supplying a reference value (R$\alpha$ and R$\gamma$, respectively) for control and extinction angles ($\alpha$ and $\gamma$, respectively) for any of the other control units mentioned, and wherein the influencing signal (HCC, HCR) is supplied to said reference value control unit to reduce the reference value generated thereby.

31. A method according to claim 18, wherein the influencing signal (HCC) is formed as the output signal from a regulator in dependence on the difference between the calculated value of the stress parameter and its comparison value (PDR3, UR3, TRR3, TTR3).

32. A method according to claim 18, wherein the influencing signal (HCR) is formed as the output signal from a ramp function device (RFD).

33. A method according to claim 18, comprising calculation of at least two stress parameters, wherein the influencing signal (HTH) is formed in dependence on influencing signals (HTHP, HTHU, HTHR, HTHT), emanating from any of the stress parameters and which are formed upon a comparison between a comparison value (PDR2, UR2, TRR2, TTR2) associated with the respective stress parameter and its calculated value.

34. A method according to claim 31, comprising calculation of at least two stress parameters, wherein the influencing signal (HCC) is formed as the greatest of influencing signals (HPR, HUR, HTRR, HTTR), emanating from a regulator associated with any of the stress parameters.

* * * * *